United States Patent
Sabev et al.

(10) Patent No.: US 8,046,731 B2
(45) Date of Patent: Oct. 25, 2011

(54) TIMER SERVICE COMPUTER PROGRAM COMPONENTS

(75) Inventors: Hristo K. Sabev, Bourgas (BG); Georgi N. Stanev, Sofia (BG)

(73) Assignee: SAP AG, Walldorf (DE)

( * ) Notice: Subject to any disclaimer, the term of this patent is extended or adjusted under 35 U.S.C. 154(b) by 1250 days.

(21) Appl. No.: 11/413,370

(22) Filed: Apr. 28, 2006

(65) Prior Publication Data

US 2007/0255716 A1    Nov. 1, 2007

(51) Int. Cl.
*G06F 9/44* (2006.01)
(52) U.S. Cl. ........ 717/102; 717/101; 717/103; 717/116; 709/212; 709/213; 709/214; 713/601
(58) Field of Classification Search ................... 717/102, 717/106–108, 116–118; 713/300, 502, 601; 700/14; 709/203, 223
See application file for complete search history.

(56) References Cited

U.S. PATENT DOCUMENTS

| | | | | |
|---|---|---|---|---|
| 5,289,460 | A * | 2/1994 | Drake et al. | 370/245 |
| 5,781,726 | A * | 7/1998 | Pereira | 709/200 |
| 5,983,143 | A * | 11/1999 | De Wille | 701/1 |
| 6,167,423 | A * | 12/2000 | Chopra et al. | 718/100 |
| 6,539,030 | B1 * | 3/2003 | Bender et al. | 370/469 |
| 6,680,955 | B1 * | 1/2004 | Le | 370/477 |
| 6,807,547 | B2 * | 10/2004 | Matena et al. | 1/1 |
| 6,950,852 | B1 * | 9/2005 | Kobayaghi et al. | 709/204 |
| 7,089,585 | B1 * | 8/2006 | Dharmarajan | 726/8 |
| 7,305,671 | B2 * | 12/2007 | Davidov et al. | 717/172 |
| 7,620,724 | B2 * | 11/2009 | Weisman et al. | 709/227 |
| 7,661,015 | B2 * | 2/2010 | Revanuru et al. | 714/4 |
| 7,661,027 | B2 * | 2/2010 | Langen et al. | 714/15 |
| 7,702,957 | B2 * | 4/2010 | Shinn et al. | 714/38 |
| 2002/0004851 | A1 * | 1/2002 | Matena et al. | 709/315 |
| 2002/0165999 | A1 * | 11/2002 | Hardin et al. | 709/318 |
| 2003/0126195 | A1 * | 7/2003 | Reynolds et al. | 709/203 |
| 2003/0237050 | A1 * | 12/2003 | Davidov et al. | 715/513 |
| 2004/0236860 | A1 * | 11/2004 | Logston et al. | 709/230 |
| 2005/0050188 | A1 * | 3/2005 | Davis et al. | 709/223 |
| 2005/0273674 | A1 * | 12/2005 | Shinn et al. | 714/55 |
| 2006/0294527 | A1 * | 12/2006 | Hardin et al. | 719/328 |
| 2007/0271365 | A1 * | 11/2007 | Revanuru et al. | 709/223 |
| 2007/0288481 | A1 * | 12/2007 | Shinn et al. | 707/10 |
| 2008/0133467 | A1 * | 6/2008 | Davis et al. | 707/2 |
| 2009/0265464 | A1 * | 10/2009 | Jakobson | 709/224 |

OTHER PUBLICATIONS

Title: Efficient timing management for user-level real-time threads, author: Oikawa et al, source: IEEE, dated: May 15, 1995.*
Title: SRB: shared running buffers in proxy to exploit memory locality of multiple streaming media sessions, author: Chen etl al, source: IEEE, dated: Feb. 28, 2005.*

* cited by examiner

*Primary Examiner* — Chameli Das
(74) *Attorney, Agent, or Firm* — Schwegman, Lundberg & Woessner, P.A.

(57) ABSTRACT

A method and apparatus for a timer service for program components. An embodiment of a method includes receiving a request for a timer for a program component. The method further includes establishing the timer for the program component, where the program component timer is implemented as a shared session. A timeout is received for the generated program component timer, and the timeout is resolved for the program component.

20 Claims, 9 Drawing Sheets

TIMER SERVICE COMPUTER PROGRAM COMPONENTS

TECHNICAL FIELD

Embodiments of the invention generally relate to the field of computer systems and, more particularly, to a method and apparatus for a timer service for computer program components.

BACKGROUND

In computer operations, programming may commonly use program components. Components may include, but are not limited, to JavaBeans for Java operations. Java operations may include operations under the J2EE (Java 2 Platform, Enterprise Edition) environment. Java beans include enterprise JavaBeans (EJBs), where Enterprise JavaBean technology is the server-side component architecture established for the J2EE platform. The operation of enterprise JavaBeans are defined by the Enterprise JavaBeans Specification, Version 2.1, Final Release Nov. 12, 2003 (Release: Nov. 24, 2003), the Enterprise JavaBeans Specification, Version 3.0 Proposed Final Draft, Dec. 19, 2005 (Release: Dec. 21, 2005), and subsequent standards (referred to herein jointly as the "EJB specification").

In utilizing program components, it may be useful to implement timers such that the operation of a component may be subject to a timeout after a certain time period. The timers may be implemented in, for example, a timer service. In one example, a timer service may be provided to register an EJB for a timer callback, which may, for example, occur at a specified time, after a specified elapsed time, or at specified time intervals. The implementation of timers may include an implementation by an EJB container as provided in the EJB specification.

However, conventional timer implementations for components, including EJB timer systems, have certain drawbacks in operation. Certain implementations may be inefficient and overly complex. For example, a timer for a component may be generated as another program component, with the timer service normally persisting timers in a database. In such system, the program code or module that is responsible for a timeout notification is generally decoupled from the program code or module that is responsible for the timer persistence. Further, in certain processes the persistence of timers is used to provide fault tolerant operation because the process does not include a failover facility.

SUMMARY OF THE INVENTION

A method and apparatus for a timer service for computer program components are described.

In one aspect of the invention, a method includes receiving a request for a timer for a program component. The method further includes establishing the timer for the program component, where the program component timer is implemented as a shared session. A timeout is received for the generated program component timer, and the timeout is resolved for the program component.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
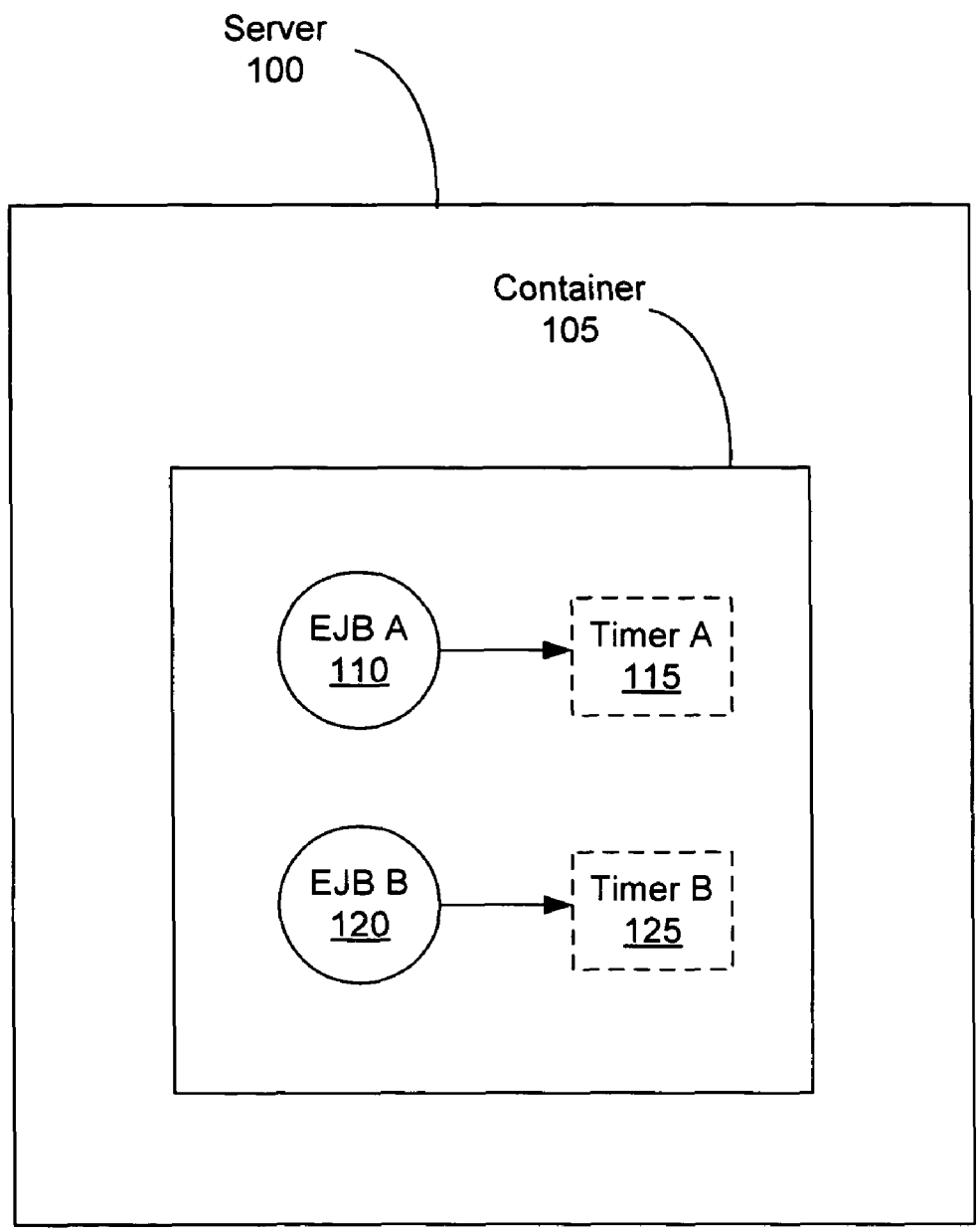
FIG. 1 is an illustration of the provision of timers for program components in an embodiment of the invention.

Embodiments of the invention are generally directed to a method and apparatus for a timer service for computer program components As used herein, a "software component" or "component" is a reusable set of code or program block that can be combined with other components to form an application. In an example, a component may represent a software bundle of variables and related methods that is utilized in object-oriented programming. "Component" includes a JavaBean in Java application development.

The trademarks, "Java", "Enterprise JavaBean", and "Java 2 Platform, Enterprise Edition" as referenced herein are the property of their respective trademark owners. As used herein, an "Enterprise JavaBean" or "EJB" bean is a JavaBean component provided for the Java 2Platform, Enterprise Edition (J2EE) environment. EJB beans include "session beans", which are not persistent, and "entity beans", which represent business objects in a persistent storage mechanism. Session beans may be "stateful" or "stateless". A stateful session bean is an EJB bean that acts as a server-side extension of the client that uses it. The stateful session bean is created by a client and will work for only that client until the client connection is dropped or the bean is explicitly removed, with the state being retained for the duration of the client-bean session. If the client removes the bean or terminates, the session ends and the state disappears. A stateless session bean does not maintain a conversational state for a particular client. When a client invokes the method of a stateless bean, the' bean's instance variables may contain a state, but only for the duration of the invocation. When the method is finished, the state is no longer retained.

As used herein, "persistence" is the quality of a program component to exist beyond an application or process. For example, an entity bean may be referred to as persistent because the state of the entity bean may exist beyond the lifetime of an application or J2EE server process. For an EJB, persistence may include container-managed persistence, where an EJB container handles all database access required by the entity bean and is responsible for saving the state of the bean, and bean-managed persistence, where the entity bean handles database access is directly responsible for saving its own state.

As used herein, a "container" is an application program or subsystem in which a component is run. A container represents an interface between a component, such as a JavaBean, and the low-level platform-specific functionality that supports the component. Containers include EJB containers, which manages the execution of EJBs for J2EE applications. Enterprise JavaBeans and their container run on a J2EE server.

As used herein, "shared memory" is memory that may be accessed by multiple applications. In one example, a shared memory is a memory that may be accessed by multiple applications, including multiple EJBs.

As used herein, "session management framework" is a software framework to manage sessions for a system or network. As used herein, a session is a lasting computer connection between elements, including, but not limited to, a connection between a client and a server.

As used herein, an "adapter" is a software program or component to adapt or accommodate a program interface to another program interface.

In an embodiment of the invention, a timer service is provided for a program component. In an embodiment of the invention, the timers managed by a timer service are implemented as shared sessions in shared memory. In an embodiment of the invention, a server utilizes a session management framework to implement and support the timer service. In an embodiment, the session management framework provides for shared sessions, which may be utilized for component timers. In an embodiment, the timer service utilizes a timeout facility of the session management framework to provide a timer function for a component. The session management framework provides a timer service with persistent operation, fault tolerance, and transaction awareness.

In an embodiment of the invention, a container for program components includes an internal timer service. In an embodiment, the internal timer service provides for indirect operations to provide timer services to program components. In an embodiment, the internal timer service includes interfaces that operate through an adapter to access standard timer service interfaces.

In computer programming, various program components, including EJBs, may be used to develop applications. For example, a J2EE application may include a number of EJBs. Various services by be provided by a system to the program components. Among the different services that may be provided for components are timer services. Timer services generally provide a program component with a timer that expires at some time or times, which may be used for many different uses in applications.

In one example, EJBs utilize an EJB timer service, as provided in the EJB specification. The specification defines the EJB timer service as a container-managed service that provides callbacks to be scheduled for time-based events. The timer service is implemented by the EJB container, with an EJB accessing the service by means of dependency injection, the EJB context interface, or through lookup in the JNDI (Java Naming and Directory Interface) namespace. The timer service is intended as a coarse grained timer notification service designed for use in modeling of real-time events.

In connection with the EJB timer service, the EJB specification defines certain interfaces and classes in the javax.ejb package. The javax.ejb package generally contains the Enterprise JavaBeans classes and interfaces that define the contracts between an EJB and its clients and between the EJB and the EJB container. An EJB container will at minimum provide for implementations of a TimerService interface (providing access to the EJB timer service to create a timer for an EJB or to get any active timers associated with an EJB), a Timer interface (providing access to the timer in order to cancel or obtain information about the timer), and a TimerHandle interface (providing access to obtain a serializable timer handle that may be persisted). An EJB class that is registered with a timer service for timer callbacks requires a timeout callback method to handle the callbacks.

In one embodiment of the invention, a timer service is established for and EJB container that provides for efficient and effective operation using session management structures. In an embodiment of the invention, the timer service is implemented to provide timers for program components as shared sessions. In one embodiment, the shared session is maintained in shared memory. In an embodiment, EJBs may be registered for timer callback methods via the use of a shared session. The shared session utilizes a timeout facility provided for sessions. In an example, the time out facility may be a single timeout facility provided by a session management facility that polls each session at intervals to determine whether the session has expired. In an embodiment of the invention, the timer service utilizes this timeout facility to implement the different timeout structures that are needed for program components.

In an embodiment of the invention, the timer system is implemented in certain software layers. A first layer may be a program object layer, such as an EJB internal timer service layer (TimerService). The internal timer service layer implements the operation of the timer service. Each timer of the class of the internal timer service layer uniquely identifies a timer. A second layer may be a timer service adapter. The timer service adapter may be used to adapt the interfaces of the internal timer service layer with established timer service interfaces. In a specific example for an EJB container, the internal timer service may be implemented using interfaces that adapt to the interfaces in the javax.ejb package.

The timer service as specified by the EJB specification is of type javax.ejb.TimerService. In an embodiment of the invention, the timer service interface (javax.ejb.TimerService) is implemented by a particular class for the adapter (TimerServiceAdapter). When an EJB obtains a reference to the javax.ejb.TimerService interface through a call to get the timer service (getTimerService), the EJB actually receives an instance of the adapter class. In an embodiment, calling a create method in the timer service causes the adapter class to create and return an instance of the timer adapter, which implements the timer interface. When an EJB performs a timer operation, the timer adapter calls the appropriate method on the internal timer service and passes the timer identity for the appropriate as an argument. Using an embodiment of the invention, the internal timer service does not define a "timer entity", as may occur in a conventional timer service operation. Instead, each request to create, cancel, change, or query a timer is performed by the TimerService interface passing a timer identity (TimerIdentity) of the timer as an argument. In contrast, the EJB specification essentially describes an EJB timer service in terms of a factory for timers, with subsequent query and cancellation operations being performed on the timers that have java type javax.ejb.Timer.

In an embodiment of the invention, a timer session may be based on session timeout structure that is provided by a session management framework. In an embodiment, the session management framework implements the operation of sessions, including shared sessions that represent EJB timers. An implementation that exists for session management may be expanded in order to support a program component timer. In one example, a default timeout mechanism that is provided for a session may be used to deliver the timeout notification for each timer. In an embodiment, a default timeout mechanism for sessions that provides timer that provides a single timeout (such as a timeout that expires once after a particular time interval) may be utilized to implement a timeout at multiple types of timer intervals, including a timeout at a specific time, after a particular elapsed duration, or at specific recurring intervals. In an embodiment, a timer session makes use the existing timeout method for a shared session to provide the EJB timer. In this embodiment, when a timer session is created a timeout is established for the first time period for the shared timer session. When the timeout period for the shared timer session is reached, there is decision whether to close the session if there are no further timer periods, which will provide for a time out for the EJB at a specified time or after a specified interval, or to establish a new timeout period if there is an additional timer period, which provides for timeouts for the EJB at specified intervals. This same action may be taken for each subsequent timer period during the course of the specified timeout intervals. Thus, the process thus may use an existing process for a timeout that may be intended for a different purpose to establish the operation of a variety of timer periods.

In an embodiment of the invention, a timer service is based on a session management framework that provides a method for providing fault tolerance in a J2EE engine in the same manner as the fault tolerance for sessions such as HTTP (HyperText Transfer Protocol) sessions, stateful (indicating the capability of retaining a state) bean sessions, and other sessions. The fault tolerance is important because timers generally are required to survive container crashes. In addition, a session management framework provides a convenient method to implement timeout notification for a particular timer, while also eliminating the need for cluster-wide communications between EJB containers residing on separate cluster nodes for timer service operations because all timers are stored together.

In one particular example, a timer session may utilize VMCLite™ shared memory of SAP AG. In particular, the session management framework of such system may be used. In this example, each timer is a shared session in the shared memory. The default timeout provided for shared sessions is used to deliver the timeout for each timer.

In embodiment of the invention, the implementation of a timer service in a session management framework may assist in providing for persistence and fault tolerance, with timers thus surviving container crashes and server shutdowns. In certain conventional operations, persistence may be used to deliver fault tolerant operation because of the lack of a common failover facility for timer sessions. In contrast, the implementation of a timer as a shared session supported by a session management framework allows a timer service to take advantage of HTTP and stateful bean failover protection required for sessions.

Invocation of methods to create and cancel timers is typically made within a transaction and thus a timer session should be transaction aware. In an embodiment of the invention, a system provides transaction awareness for the timer service of a program component. As used herein, "transaction awareness" refers to awareness of the state of a transaction, which allows the timer session to be eliminated if the transaction is rolled back. In connection with the transaction awareness and the ability of the creation of a timer to be rolled back upon transaction rollback, the timer session is not stored until the relevant transaction is committed. In one embodiment of the invention, a SessionHolder class is provided that stores a shared session only at the end of a transaction, when the transaction is committed. Further, the cancellation of timer in a transaction is rescinded upon rollback of the transaction. The delay in storing provides transaction awareness and ensures that a timer session can be deleted without effect if a transaction is rolled back, and that a timer will continue if a cancellation occurs in a rolled back transaction.

The delay in storing a timer session in a session management framework further provides for isolation between transactions. In an embodiment, separate transactions are not visible to each other because the timer sessions are not stored until each respective transaction is committed. In this manner, interference between transactions is avoided.

In an embodiment of the invention, the use of a session management framework is used to identify the timer sessions to be retained or invalidated. For example, in the implementation of stateful session beans. In an embodiment, an invalidation agent is used to check sessions and make a determination regarding retention. In an embodiment, a timeout listener is provided for any EJBs. At each timeout notification, the invalidation agent then enumerates all current active sessions and marks them. If a marked session has been requested, the session is then unmarked, which shows access since the last marking. At the next marking, if the session is unmarked it has been accessed, and the session is thus retained and marked. If the session is already marked, then the session has not been accessed and is not needed. In the latter case, the session is invalidated and destroyed.

FIG. 1 is an illustration of the provision of timers for program components in an embodiment of the invention. In this embodiment, a server 100 includes a container 105 to maintain program components. The container may include multiple program components, including a first EJB, EJB A 110, and a second EJB, EJB B 120. Each of the EJBs may be provided with a timer, shown as timer A 115 and timer B 125. The timers provide timeout notifications to the EJBs.

However, in certain conventional systems timers may be implemented as program components or similar objects. In an embodiment of the invention, the timers 115 and 125 are not provided as objects. In the embodiment, timers are instead implemented as shared sessions. In such embodiment, the operation of the EJBs is not altered from an operation with timers implemented as objects, and standard operations for the EJBs are maintained.

Figure 2:
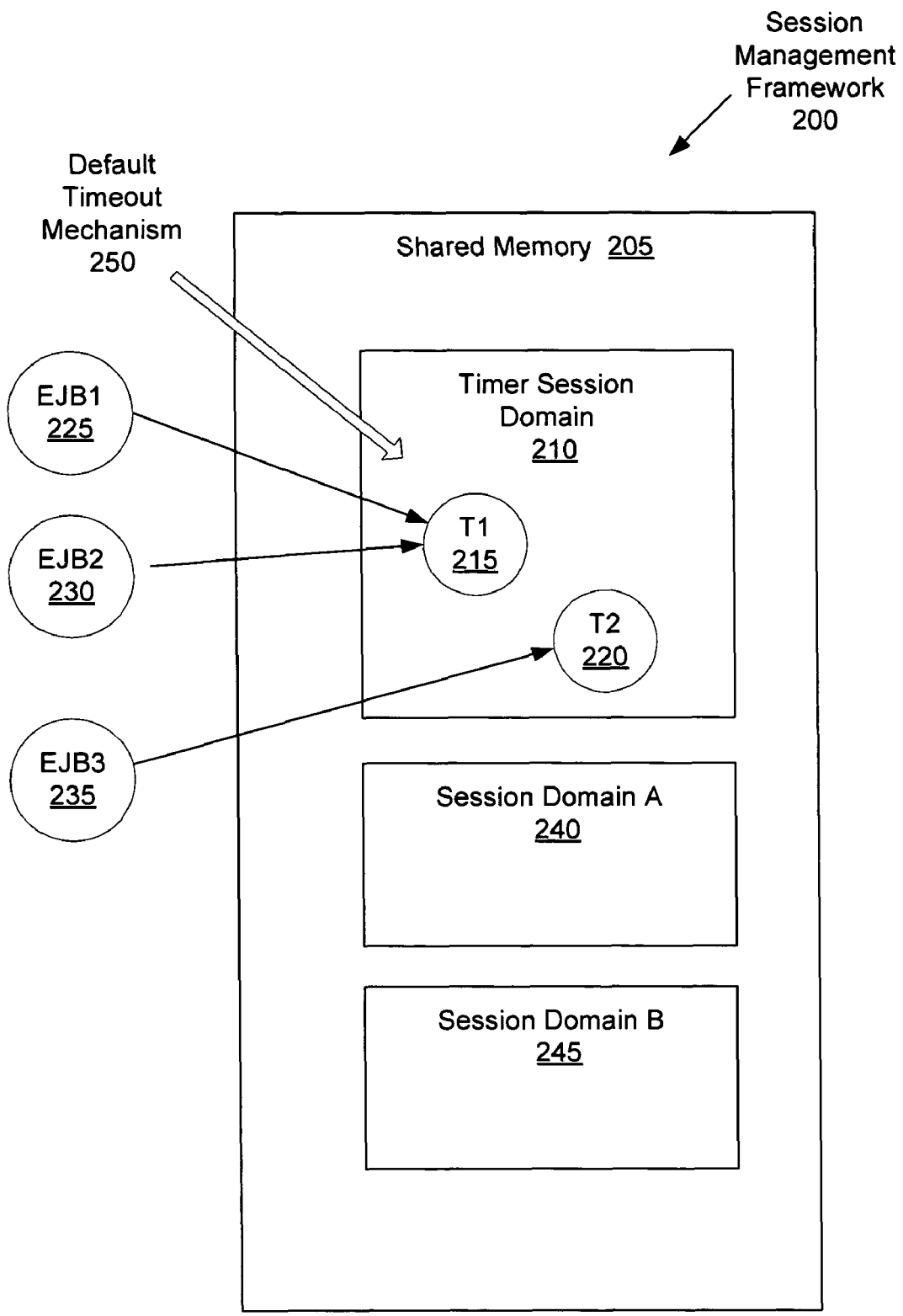
FIG. 2 is an illustration timer sessions in an embodiment of the invention.

FIG. 2 is an illustration timer sessions in an embodiment of the invention. In this illustration, a shared memory 205 implemented by a session management framework 200 is shown. The shared memory may include a timer session domain 210 as well as other session domains, shown as session domain A 240 and session domain B 245. In an embodiment of the invention, a timer for a program component is implemented as a shared session, such as timer T1 215 and timer T2 220. In an embodiment, all timer sessions, such as T1 215 and T2 220, are set apart in a session domain from other session domains 240-245 in shared memory. For this reason, no other session has access to the timer sessions, thereby providing isolation of the timing function.

In an embodiment of the invention, there is no isolation between timer sessions created for timers of separate beans, whether or not the beans reside in the same applications. For this reason, if a program has the timer identity for a timer, as created by another program, then the program can freely manipulate the timer. For example, as shown in the FIG. 2, EJB1 225 and EJB2 230 are both associated with timer session T1 215, while EJB 3 is associated with timer session T2 220. If EJB1 225 and EJB2 230 reside in different applications, but both have the timer identity of T1 215, then both such EJBs can manipulate this timer.

Figure 3:
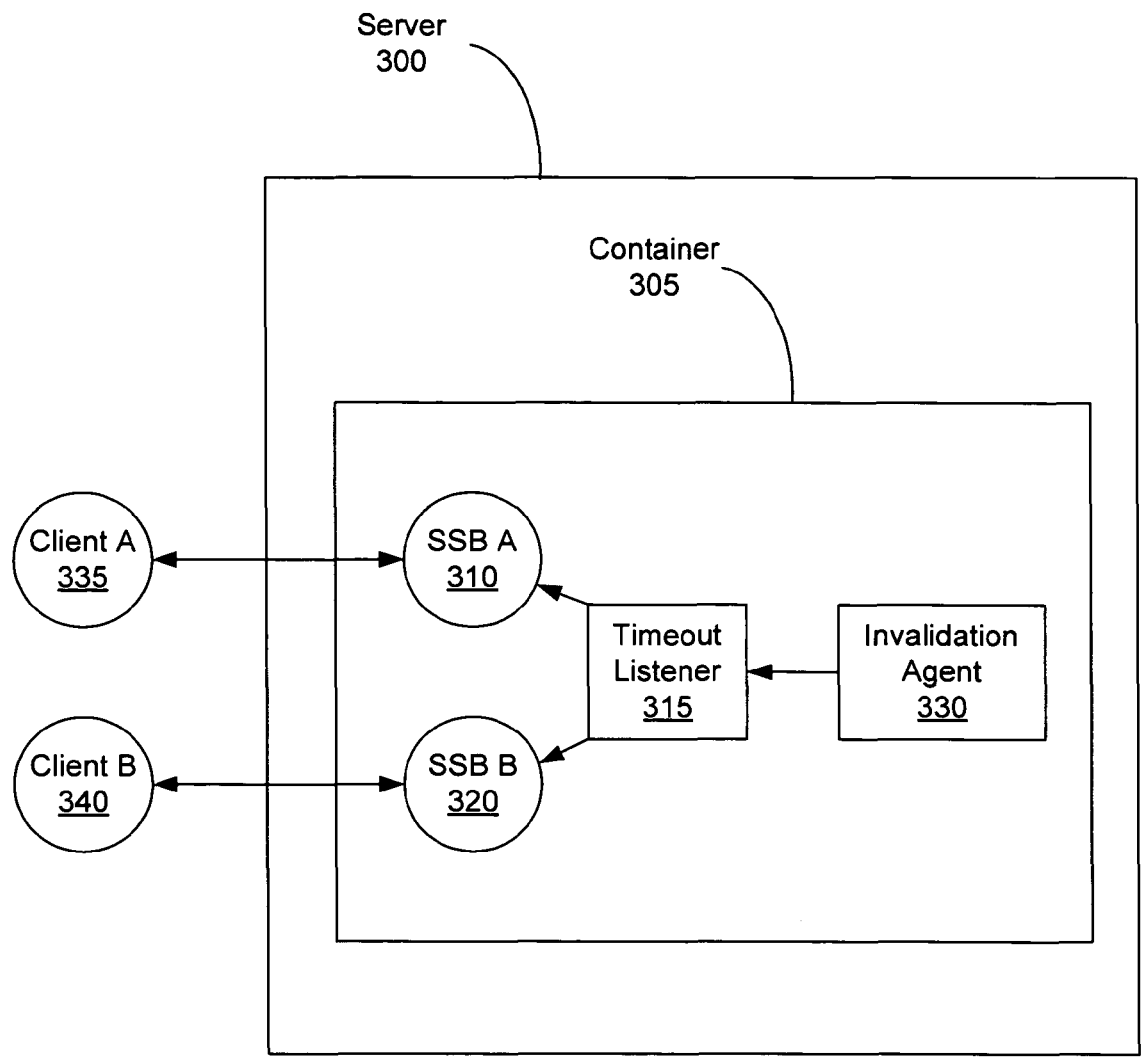
FIG. 3 is an illustration of the operation of timeouts for program components in an embodiment of the invention.

FIG. 3 is an illustration of the operation of timeouts for program components in an embodiment of the invention. In this embodiment, a server 300 includes a container 305. The container supports the operation of program components, which may, for example, include stateful session beans SSB A 310 and SSB B 320. In this illustration, SSB A 310 is engaged in a session with a first client, client A 335, and SSB B 320 is engaged in a session with a second client, client B 340. In this illustration, a timeout listener 315 is associated with each of the stateful session beans, SSB A 310 and SSB B 320. In an embodiment of the invention, a single invalidation agent 330 is used to check sessions and make a determination regarding retention of the sessions.

In an embodiment of the invention, at each timeout notification, the invalidation agent 330 enumerates all current active timer sessions and marks them. In this illustration, the timer sessions would be a timer session for SSB 310 and a timer session for SSB B 320. If a marked session has been requested, the session is then unmarked, which shows access since the last marking. At the next marking, if the session is unmarked it has been accessed, and the session is thus retained and marked. If the session is already marked, then the session has not been accessed and is not needed. In the latter case, the session is invalidated and destroyed. For example, each of the timer sessions may initially be marked by the invalidation agent 330. After the marking, it is possible that client B 340 and SSB B 320 have ended their session, and thus the timer session for SSB B 320 is no longer needed. If the timer session has thus not been accessed, then at the next marking the timer session will remain marked because it has not been accessed, and thus the timer session is then invalidated.

Figure 4:
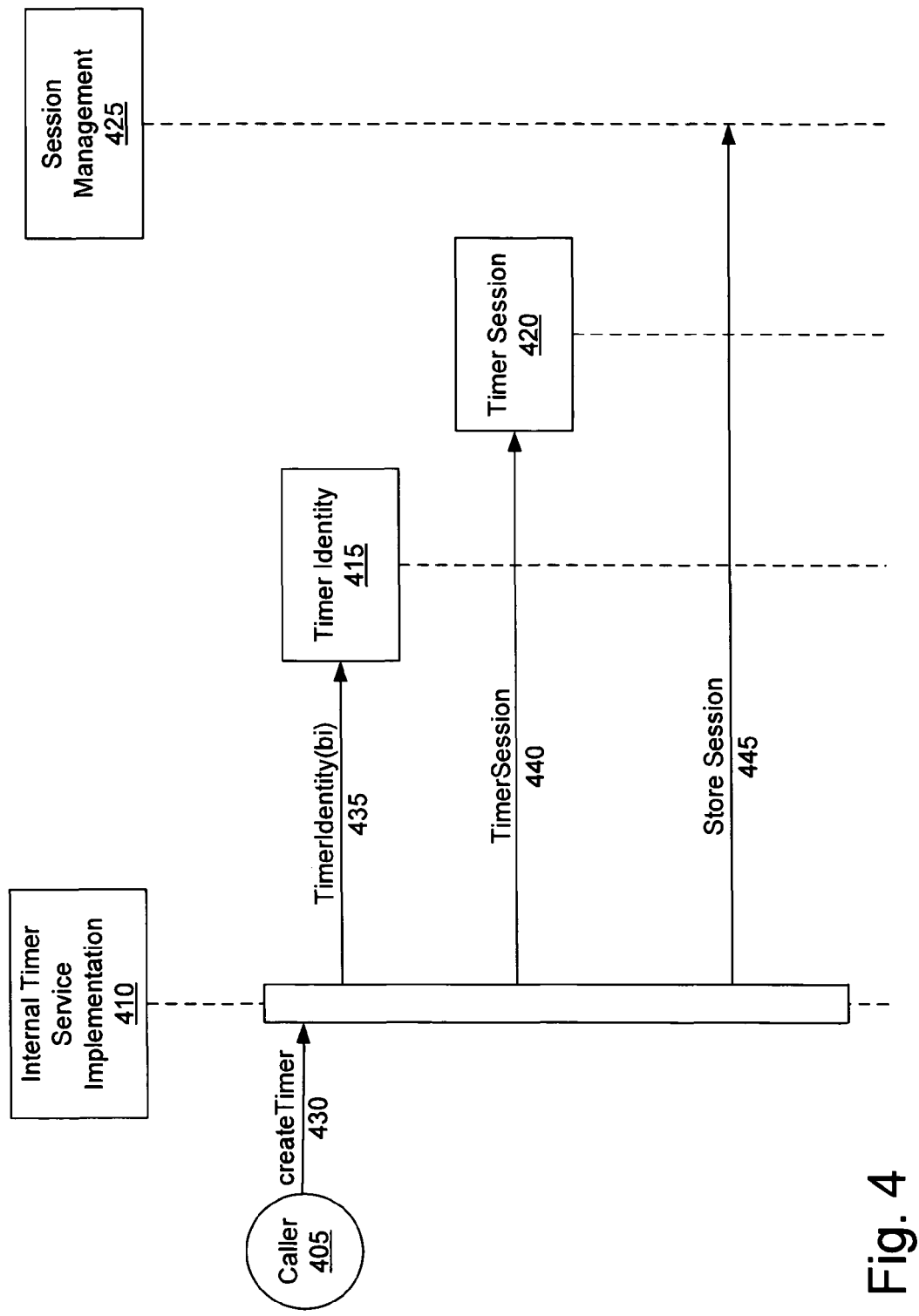
FIG. 4 illustrates an embodiment of a process for establishing a timer for a program component.

FIG. 4 illustrates an embodiment of a process for establishing a timer for a program component. In this illustration a caller 405, which may be a program component such as an EJB, makes a call 430 on an internal timer service 410 to create a timer. The call may specify certain arguments for the timer, including the bean identity (bi), the duration of the timer, and other information:

createTimer:=createTimer(bi,duration,info)

The internal timer service 415 then calls a method 435 to create a timer identity 415 to identify the newly created timer. The internal timer service 415 then calls a method 440 to create a new timer session 420 with the timer identity 415 (ti). The arguments passed may include the timer identity, the initial duration of the timer, and the duration between intervals for the timer:

Timer Session (ti, info, initialDuration, intervalDuration)

The internal timer service 415 then makes a call 440 to the session management framework 425 to instruct the framework to store the session. As indicated, the session is stored only after a transaction is committed.

A process for providing a query to a timer may be very similar to FIG. 4. After a query method is called on the internal timer service the service contacts the session management framework to request that the framework to locate the timer session with a name equal to a string representation of the timer identity passed to the query method. The necessary value is then read from the timer session and it returned to the caller.

Figure 5:
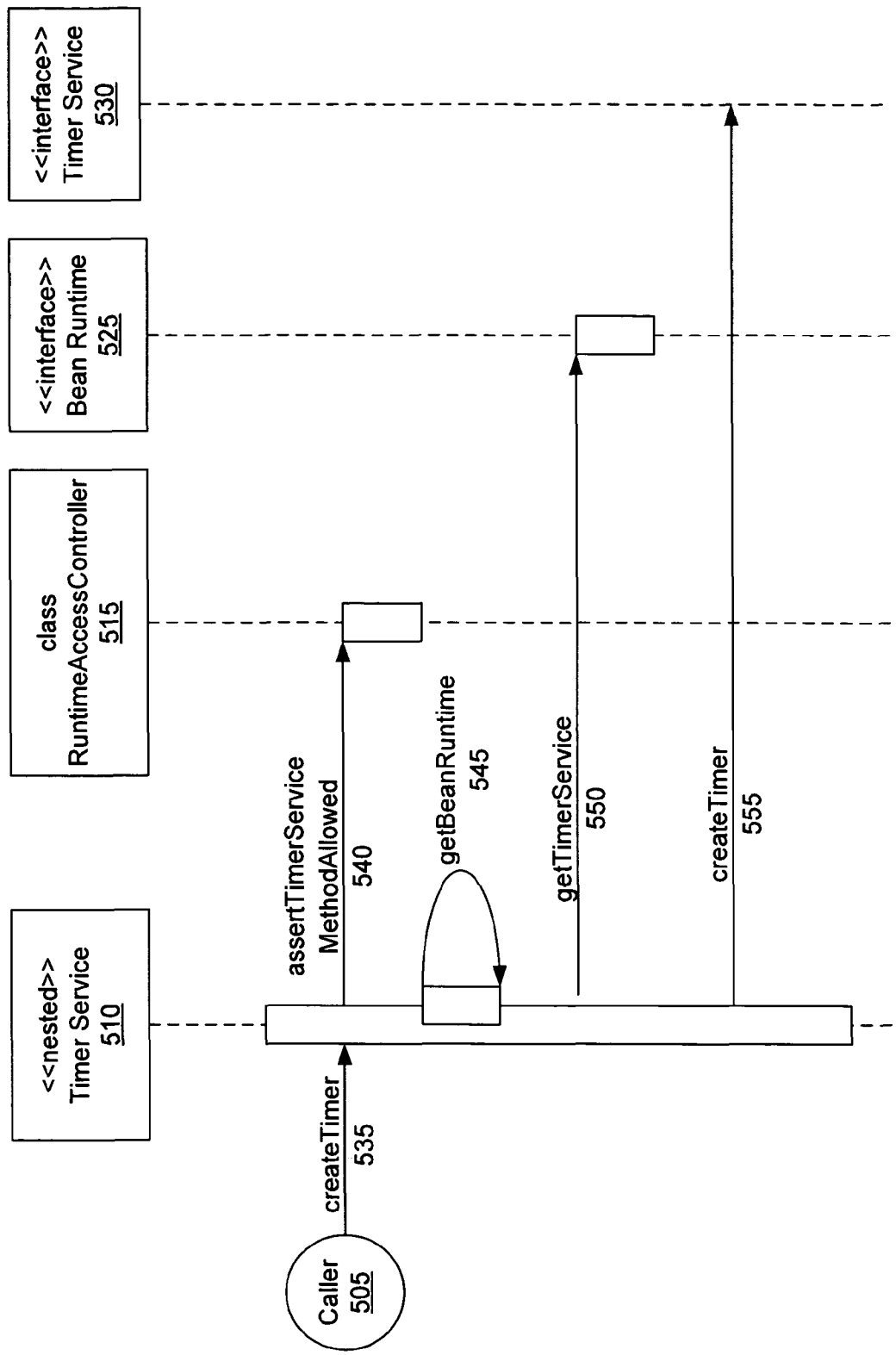
FIG. 5 is an illustration of operations followed in the creation of a timer in an embodiment of the invention.

FIG. 5 is an illustration of operations followed in the creation of a timer in an embodiment of the invention. In this illustration, a caller 505, such as an EJB, makes a call 535 to the timer service 510 to create a timer for an EJB. Not all methods of the EJB context can be invoked at any given time, with the EJB specification providing tables to indicate the conditions under which different methods of the EJB can be invoked by an EJB, with different rules and restrictions being applicable for each bean type. In this example, the timer service 510 asserts the timer service method 540 to the runtime access controller class 515.

The timer service 510 then calls the getBeanRuntime method for the EJB 545. This method locates the runtime of the bean based upon the bean identification. The timer service then makes a call 550 to the bean runtime interface 525 to get the timer service. Each bean has its own copy of the timer service and thus the timer service is requested from the runtime. The timer service finally makes a call 555 to timer service interface 530 to create the timer for the bean.

Figure 6:
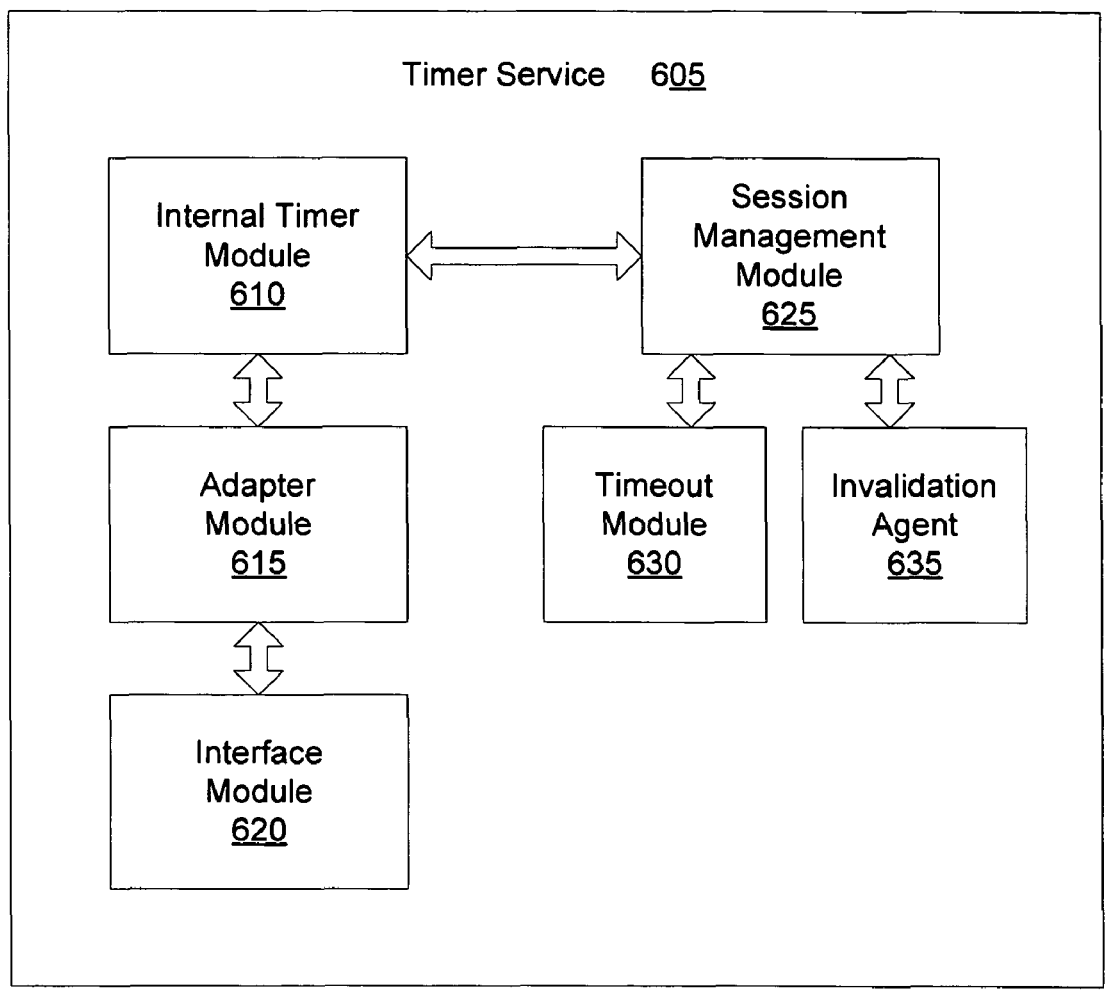
FIG. 6 is an illustration of an embodiment of a timer service.

FIG. 6 is an illustration of an embodiment of a timer service. In this illustration, a timer service 605 includes an internal timer module 610 to provide the internal operations for timer support and management. The internal timer module 610 communicates with an adapter module 615, which adapts the internal timer module 610 to address the interface module, which contains any standard interfaces for the timer service 605.

In FIG. 6, the internal timer module 610 operates with a session management module 625, the session management module 625 providing support for sessions. In an embodiment of the invention, the sessions supported the session management module 625 includes shared sessions, and the internal timer module 610 requests that the session management module 625 create shared sessions to provide for component timers. Each component timer provides a timer function for a program component, such as an EJB. The session management component includes an invalidation agent 635 to check whether sessions have been accessed and invalidate sessions if they have not been accessed.

In order to provide the timer function, the session management module 625 utilizes a timeout module 630, the timeout module providing a timeout function for sessions. In an embodiment of the invention, the timeout function provided by the timeout module 630 is used for timer service timeouts after the lapse of a time period, at a certain time, and at certain time intervals. In an embodiment of the invention, a timeout is delivered to the session management module 625 for a particular timer session. If the timer session does not require any further timeout notifications, the session is ended. If the timer session requires any additional timeout notifications, as with a timer providing timeouts at certain time intervals, then the timer session is reset for an additional timeout. The process continues as long as the timer service requires additional timeouts. When a timer service is no longer accessed, the invalidation agent 635 will detect this and will invalidate and remove the joint timer session.

Figure 7:
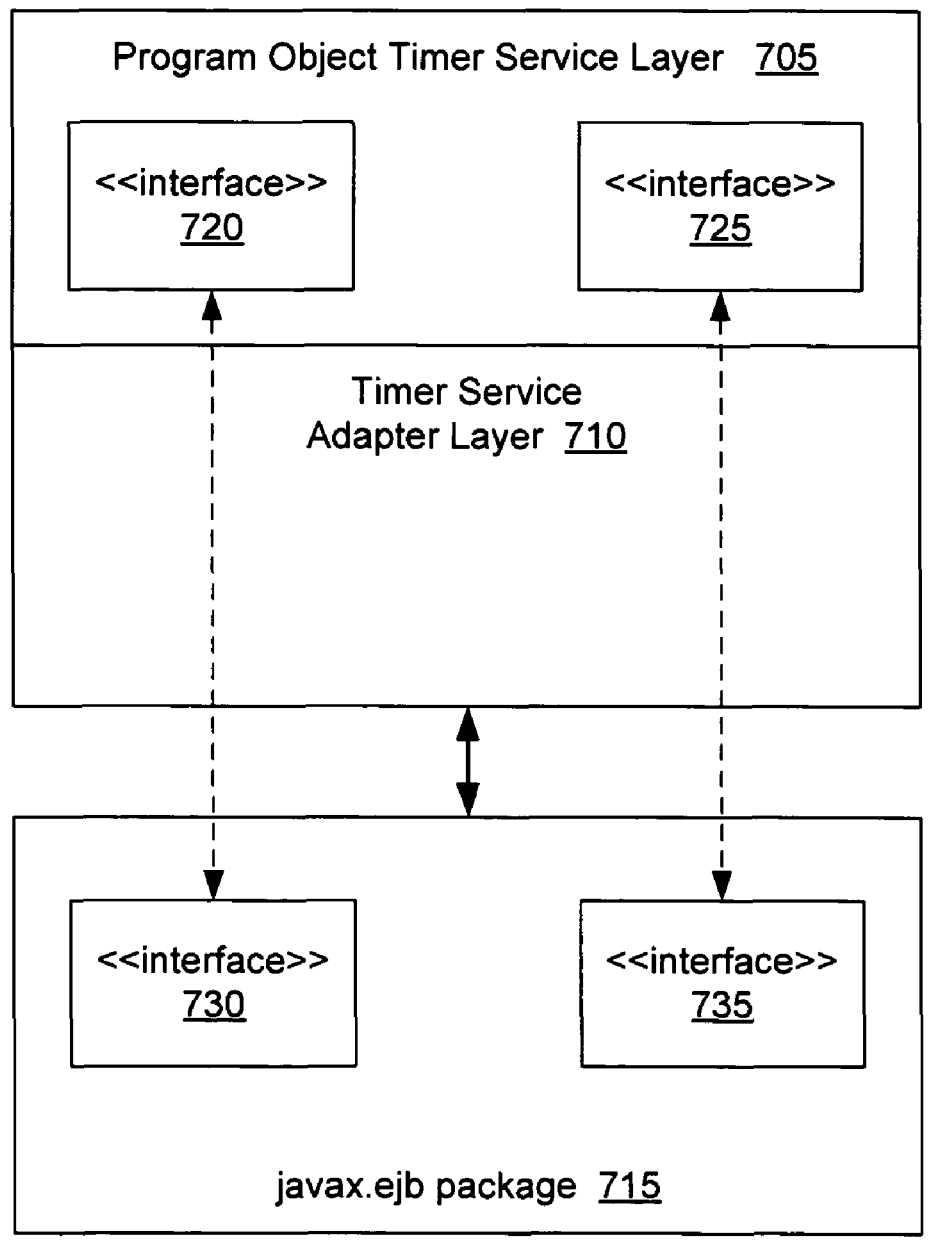
FIG. 7 is an illustration of an embodiment of software for a program component timer services.

FIG. 7 is an illustration of an embodiment of software for a program component timer services. In this illustration, a timer system may defined by certain software layers. A first layer is a program object timer service layer 705. In one example, the program object timer service layer 705 is an EJB internal timer service layer. The program object timer service layer 705 may include one or more interfaces 720-725 for the timer service. A second layer is a timer service adapter layer 710. The timer service adapter layer 710 is intended to adapt between the interfaces 720-725 of the program object timer service layer 705 to interfaces specified in the javax.ejb package. For example, in the EJB container, the internal timer service may be defined by an adapter that adapts to interfaces 730 and 735 in the javax.ejb package 715. In this example, the timer service adapter layer 710 adapts the interfaces of the internal EJB timer service to interfaces, such as the interfaces defined in the EJB specification and defined in package javax.ejb 715.

Figure 8:
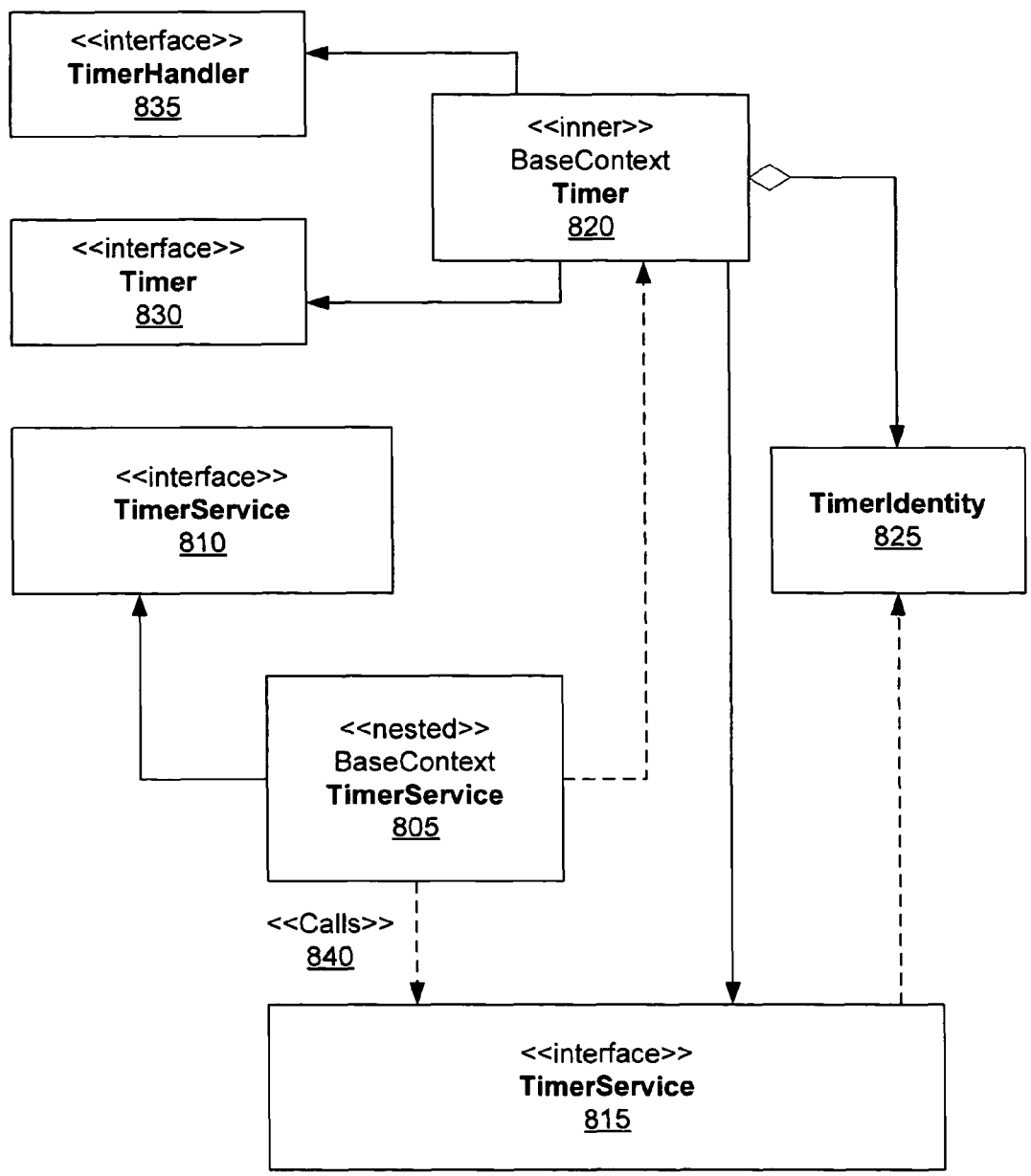
FIG. 8 is an illustration an embodiment of an adaptor layer for a program object timer service.

FIG. 8 is an illustration an embodiment of an adaptor layer for a program object timer service. FIG. 8 illustrates the static structure of the adapter layer. In FIG. 8, the actual implementation of javax.ejb.Timer (interface Timer 830) and javax.ejb.TimerHandler (interface TimerHandler 835) is given by an inner class BaseContext.Timer 820. BaseContext.Timer 820 timer service 805 is shown coupled with nested BaseContext TimerService 805, which provides for javax.ejb.TimerService (interface TimerService interface 810 and 815), the defined the EJB container internal timer service. The EJB container is able to work with all timer service implementations that conform to this interface. The interface provides methods that include canceling a timer, creating a timer, destroying a timer service, and queries regarding timers. The timer service may provide for creation of a timer with a particular timer identity 825.

Figure 9:
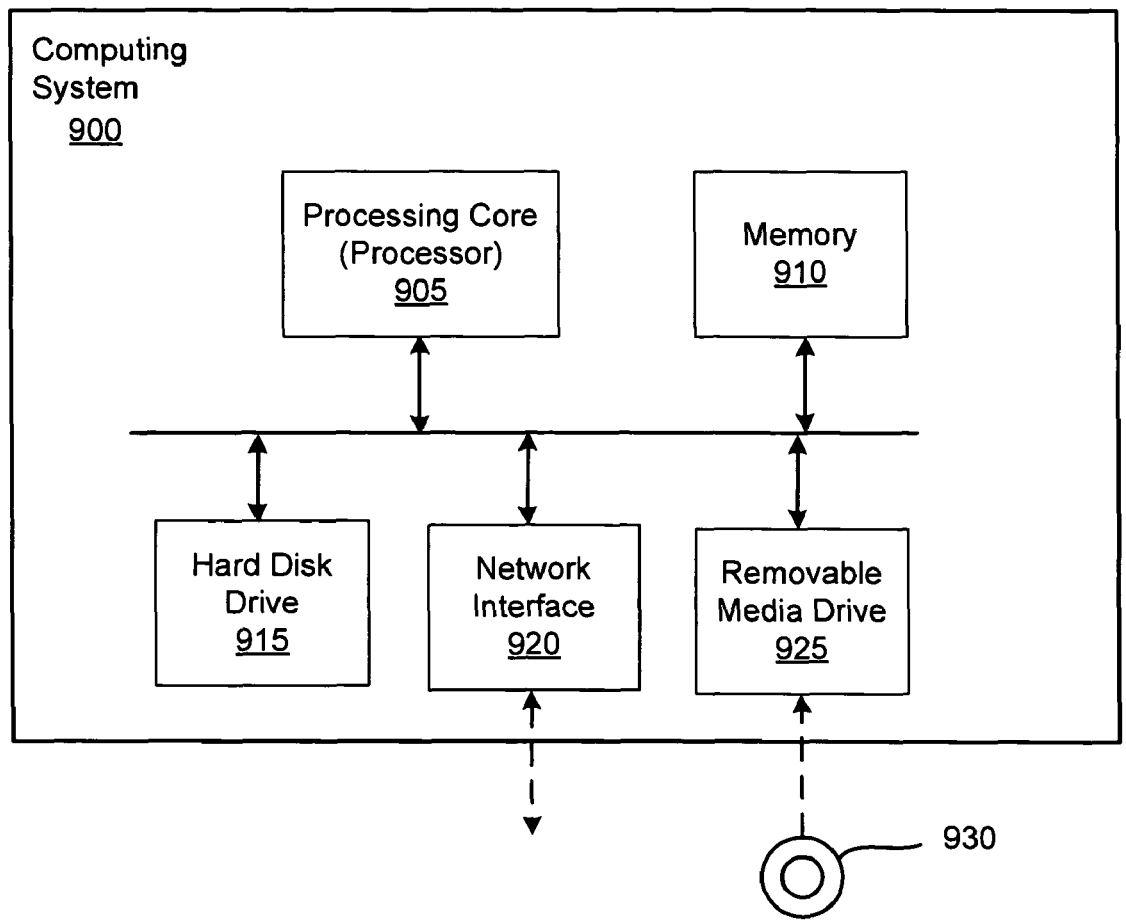
FIG. 9 illustrates a computing system that may be used in an embodiment of the invention

FIG. 9 illustrates a computing system that may be used in an embodiment of the invention. As illustrated, a computing system 900 can execute program code stored by an article of manufacture. The computing system block diagram of FIG. 9 is just one of various computing system architectures. The applicable article of manufacture may include one or more fixed components (such as a hard disk drive 915 and memory 910) and/or various movable components such as a removable media driver 925, such as a driver for a CD ROM, a floppy disk, a magnetic tape, or other similar media 930. In order to execute the program code, instructions of the program code are loaded into the memory 910, where the memory may include random access memory (RAM) or other memory. A processing core 905 then executes the instructions. The processing core 905 may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 905. The computing system 900 further includes a network interface 920 for communication over a network.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
    at a processor-implemented timer service including an internal timer module, an adapter module, and a session management module, receiving a request for a timer for a program component, the request being received via the adapter module, the adapter module configured to adapt a timer interface, accessible to program components, for use with the internal timer module of the timer service;
    establishing with the session management module the timer for the program component, the program component timer being implemented as a shared session based on a session timeout structure and having a timeout facility provided by the session management module, the session management module being part of a session management framework for managing connections between a client and a server and providing a single, centralized storage for timers implemented as shared sessions, the storage being a shared memory that is accessed by multiple applications including Enterprise JAVABeans (EJBs), residing on different servers;
    receiving a timeout for the program component timer; and
    resolving the timeout for the program component.

2. The method of claim 1, further comprising storing the shared session in the shared memory.

3. The method of claim 1, wherein the timer provides one of a time out at a specified time, a time out after a specified period, or a plurality of time outs at specified intervals.

4. The method of claim 1, wherein establishing the timer comprises establishing the timer in a transaction.

5. The method of claim 4, further comprising rolling back the time if the transaction is rolled back.

6. The method of claim 4, wherein a second program component having a timer identity for the timer can manipulate the timer.

7. The method of claim 1, wherein the program component is an Enterprise JAVABean (EJB) bean in a J2EE JAVA 2Platform, Enterprise Edition) environment.

8. The method of claim 1, wherein generating the timer comprises sending a request to a timer service interface.

9. A timer service for a program component comprising:
    a processor-implemented internal timer module, the internal timer module providing timers for program components;
    a processor-implemented session management module that is part of a session management framework for managing connections between clients and a server and providing a single, centralized storage for timers implemented as shared sessions based on a session timout structure, the storage being a shared memory that is accessed by multiple applications, including Enterprise JAVABeans (EJBs), residing on different servers, the session management module creating shared sessions, the timers for program components being represented by shared sessions; and
    a processor-implemented adapter module, the adapter module adapting the internal timer module to an interface module, the interface module including a plurality of interfaces by which a program component can invoke operation of the timer module.

10. The timer service of claim 9, wherein the timer service provides timers for Enterprise JAVABean (EJBs) beans in a JAVA 2Platform, Enterprise Edition (J2EE) environment.

11. The timer service of claim 10, wherein the interface module provides standard interfaces for an Enterprise JAVABean (EJB) timer service.

12. The timer service of claim 10, wherein the session management module utilizes a timeout module to obtain timeout notifications for sessions, and wherein the timeout module provides timeouts for the timers for program components.

13. The timer service of claim 10, wherein the session management module includes an invalidation agent to invalidate timers that are not accessed for a period of time.

14. A server comprising:
a processor to run an application, the application including one or more program components; and
a memory to hold applications for the processor, the memory to include a container to support the program components, the container to provide for the timer service for the program components, wherein the timer service provides to the program component a timer implemented as a shared session based on a session timeout structure and having a timeout facility provided by a session management framework that manages connections between a client and the server and provides a single, centralized storage for timers implemented as shared sessions, the storage being a shared memory that is accessed by multiple applications, including Enterprise JAVABeans (EJBs), residing on different servers.

15. The server of claim 14, wherein a program component comprises an Enterprise JAVABean (EJB) bean.

16. The server of claim 15, wherein the container supports a JAVA 2 Platform Enterprise Edition (J2EE) environment.

17. A machine-readable storage medium having stored thereon data representing sequences of instructions that, when executed by a machine, cause the machine to perform operations comprising:
receiving a timer service request for a program component;
generating the timer for the program component, the timer being implemented as a shared session in shared memory based on a session timeout structure provided by a session management framework for managing connections between a client and a server, the shared memory providing a centralized storage mechanism for timers for program components and accessible by multiple applications, including Enterprise JAVABeans (EJBs), residing on different servers; and
providing a timeout for the program component using the shared session.

18. The medium of claim 17, wherein the timer provides one of a time out at a specified time, a time out after a specified period, or a plurality of time outs at specified intervals.

19. The medium of claim 17, wherein the timer is generated in a transaction and the timer is eliminated if the transaction is rolled back.

20. The medium of claim 17, wherein the program component is an Enterprise JAVABean (EJB) bean in a J2EE (JAVA 2Platform, Enterprise Edition) environment.

* * * * *